United States Patent [19]
Tucker, Jr.

[11] 3,899,668
[45] Aug. 12, 1975

[54] ELECTRONIC WAVE ANALYSIS

[75] Inventor: Robert B. Tucker, Jr., New Orleans, La.

[73] Assignee: Continental Oil Company, Ponca City, Okla.

[22] Filed: Mar. 25, 1974

[21] Appl. No.: 454,598

[52] U.S. Cl. ............ 235/193; 73/170 A; 235/151.3
[51] Int. Cl. .......................... G06g 7/12; G06g 7/48
[58] Field of Search............ 235/151.3, 151.32, 193; 73/170 R, 170 A, 290 R, 304 R, 308; 324/103 R, 103 P

[56] References Cited
UNITED STATES PATENTS

| | | | |
|---|---|---|---|
| 3,225,593 | 12/1965 | Richard | 73/170 A |
| 3,449,950 | 6/1969 | Dale et al. | 73/170 A |
| 3,532,980 | 10/1970 | Tucker | 324/103 R |
| 3,610,038 | 10/1971 | Joy et al. | 73/170 A |
| 3,769,838 | 11/1973 | Buckler | 73/170 A |

OTHER PUBLICATIONS

C. G. Whittenbury et al., "Instrument for Measuring Water Waves," The Review of Scientific Instruments, Vol. 30, No. 8, 8–1959, pp. 674–676.

*Primary Examiner*—Malcolm A. Morrison
*Assistant Examiner*—Jerry Smith
*Attorney, Agent, or Firm*—William J. Miller

[57] ABSTRACT

Method and apparatus, suitable for remote deployment, for measuring ocean water level and utilizing high-efficiency operational amplifiers of the Field Effect Transistor type to calculate and retain the maximum water level, mean tide level, average root mean square wave height, maximum wave height and number of waves for transmission, upon demand, to a local information center.

2 Claims, 6 Drawing Figures

PATENTED AUG 1 2 1975  3,899,668

SHEET 1

INSTANTANEOUS WATER LEVEL

NET WATER LEVEL

MEAN TIDE LEVEL

MAXIMUM WATER LEVEL

AVERAGE RMS WAVE HEIGHT

MAXIMUM WAVE HEIGHT

SIGN COMPARATOR OUTPUT

SIZE COMPARATOR OUTPUT

WAVE COUNTER OUTPUT 3,899,668

ELECTRONIC WAVE ANALYSIS

BACKGROUND OF THE INVENTION

1. Field of the Invention

This invention relates generally to ocean wave measurement systems and, more particularly, but not by way of limitation, to ocean wave measurement systems wherein information pertaining to maximum water level, mean tide level, average root mean square wave height, maximum wave height, and the number of waves are obtained at a remote monitoring location and are transmitted, by any of various means, usually upon demand, to a local information center for processing. This invention relates, more specifically, to improvements in the means and apparatus to calculate and retain, by the use of highefficiency operational amplifiers of the Field Effect Transistor type, the maximum water level, mean tide level, average root mean square wave height, maximum wave height, and the number of waves experienced at the remote monitoring location over a predetermined period of time for transmission, usually upon demand, to a local information center for processing.

2. Description of the Prior Art

The prior art in the general field of ocean wave measurement systems consists of various types of continuous measuring apparatus which either record or transmit the continuous measurement of wave motion. Those systems utilizing recording means usually require manual processing in order to derive useful information while those utilizing only transmission means require the dedication of additional computational apparatus at the receiving location in order to derive useful information.

It is desirable that the wave measurement system calculate independently, useful wave parameters and transmit or record only these data as required or desired. Digital devices capable of calculating such information generally possess undesirable power consumption characteristics and are restricted to discrete sampling techniques which limit their applicability in continuous monitoring applications. Most conventional analog devices for continuously calculating these parameters are subject to high drift rates which severely limit accuracy over periods of time in excess of only a few minutes. However, operational amplifiers of the Field Effect Transistor type, of which the present invention is comprised, are capable of such calculations and have high retainability and reasonable power consumption characteristics.

SUMMARY OF THE INVENTION

The present invention contemplates an ocean wave measurement system wherein conventional water level measuring apparatus is utilized to supply the instantaneous water level in an analog mode to variou operational amplifiers of the Field Effect Transistor (FET op amp) type having characteristics and configuration in accordance with this invention. The wave measurement system is designed to obtain at a remote location the maximum water level, mean tide level, average root mean square wave height, maximum wave height and the number of waves over a predetermined period of time and to retain this information for transmission via conventional means upon demand to a local information center for processing. The maximum water level is calculated by a peak remembering FET op amp; the mean tide level by combination of an adder/subtractor FET op amp and an integrator FET op amp; the average root mean square wave height by the combination of a multiplier FET op amp, an integrator FET op amp, and a square root FET op amp; the maximum wave height by the combination of an inverter FET op amp; three peak remembering FET op amps and an adder FET op amp; and the number of waves by the combination of an inverter FET op amp, two voltage comparator FET op amps, a constant voltage source, three diodes, and an FET op amp.

An object of this invention is an improved method and apparatus for obtaining, by analog means, the maximum water level, mean tide level, average root mean square wave height, maximum wave height and the number of waves experienced at a remote wave monitoring location over a predetermined period of time and retaining said data for transmission, upon demand, to a local information center for processing.

Another object of this invention is to provide an improved means and apparatus, utilizing analog operational amplifiers of the Field Effect Transistor type, in specific configurations so as to obtain wave measurements pertaining to maximum water level, mean tide level, average root mean square wave height, maximum wave height, and the number of waves experienced at a remote wave monitoring location over a predetermined period of time such that the power requirements are low, the system stability high, and the effective period of retainability is in the range of several hours.

Other objects and advantages of the invention will be evident from the following detailed description when read in conjunction with the accompanying drawings which illustrate various embodiments of the invention.

DESCRIPTION OF THE PREFERRED EMBODIMENTS

Figure 1:
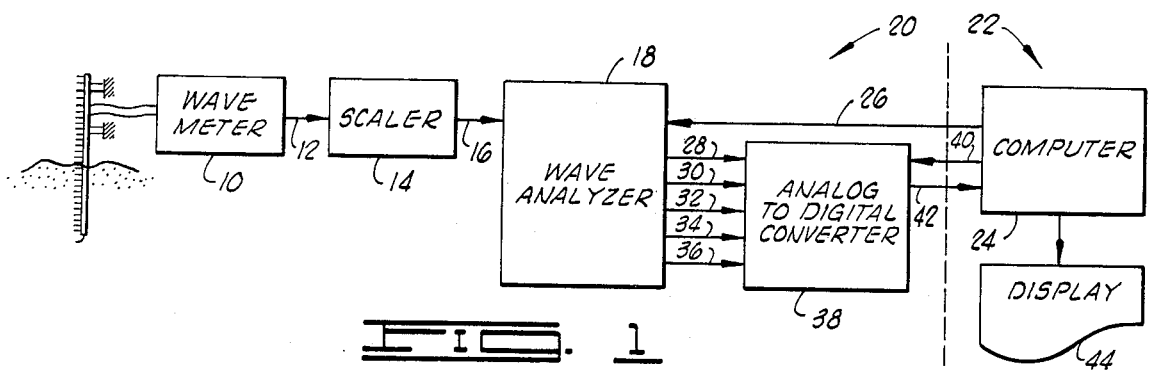
FIG. 1 is a block circuit diagram of a preferred form of the wave monitoring system constructed in accordance with the present invention.

As shown in FIG. 1, the present invention relates generally to wave characteristics monitoring systems. The wave meter 10, a device well known in the art, converts the level of water into a proportional electrical signal for output as the instantaneous water level along signal path 12. One such commercially available transducer suitable for use as wave meter 10 is the Baylor "Wave Staff," which provides an instantaneous analog output signal of 50 mv per foot of the 80 foot long wave transducer which is submerged.

Due to the variations in output voltage ranges with different commercially available wave meters 10, it is often desirable to perform range standardization so that the resultant voltage range remains within the preferred limitations of the subsequent electronic wave analysis apparatus. This function, shown in FIG. 1 as scaler apparatus 14, can be as simple as a conventional voltage divider network or as complex as to require active elements, such as an amplifier, in order to limit the voltage range to the preferred level. However, scaler apparatus 14 should contain a transfer impedance which matches the output requirements of wave meter 10 while maintaining a high impedance on the signal path 16 input to the electronic wave analyzer 18 as constructed in accordance with this invention in order to optimize overall system performance characteristics such as stability, internal capacitance, current consumption, and other considerations well understood in the art. One such active element scaler 14 capable of both dc offset current removal and ac range limiting is available from the Computer Products Division of Bell and Howell as specification type 19,116 Input Conversion Module.

As shown in FIG. 1, the wave meter 10 together with the electronic wave analyzer 18 and associated apparatus can be located at a relatively remote wave monitoring location 20 and still maintain communication with other apparatus at a local information center 22, by various means such as radio, direct line, or telephone line. FIG. 1 depicts a preferred embodiment wherein a computer 24, located at the local information center 22, is utilized to control the operation of the apparatus at the remote wave monitoring location 20. To initiate wave monitoring activities, the computer 24 transmits a reset signal along signal path 26. The reset signal causes the various components of the electronic wave analyzer 18 to begin monitoring operations as will be explained below.

As the electronic wave analyzer 18 calculates the above described wave parameters, it makes available as output the current status of the parameters. The maximum water level, representing the highest point reached by the water on the wave meter 10, is available on signal path 28. The mean tide level is available on signal path 30. The average root mean square (rms) wave height, a measure of the total wave energy, is available on signal path 32. The maximum wave height, representing the greatest vertical difference between a wave peak and the following trough, is available on signal path 34. The number of waves, representing the number of significant waves passing the wave meter 10, is available on signal path 36. Signals on signal paths 28, 30, 32, 34, and 36 are applied as inputs to the analog to digital converter 38, a device well known in the art.

After a predetermined time period, the computer 24 can transmit a demand signal along signal path 40 to the analog to digital converter 38 requesting the status of the wave parameters. The analog to digital converter 38 converts the analog wave parameter signals on signal paths 28 through 36 and multiplexes the resulting digital data signals for transmission via signal path 42 to the computer 24. The computer 24, under the control of an appropriate computer program, constructed in a manner well known in the art, can accept the digital data signal available on signal path 42 after a predetermined time period and, after separating the individual wave parameters, can display these parameters by such apparatus 44 as printer, typewriter or video display.

Figure 2:
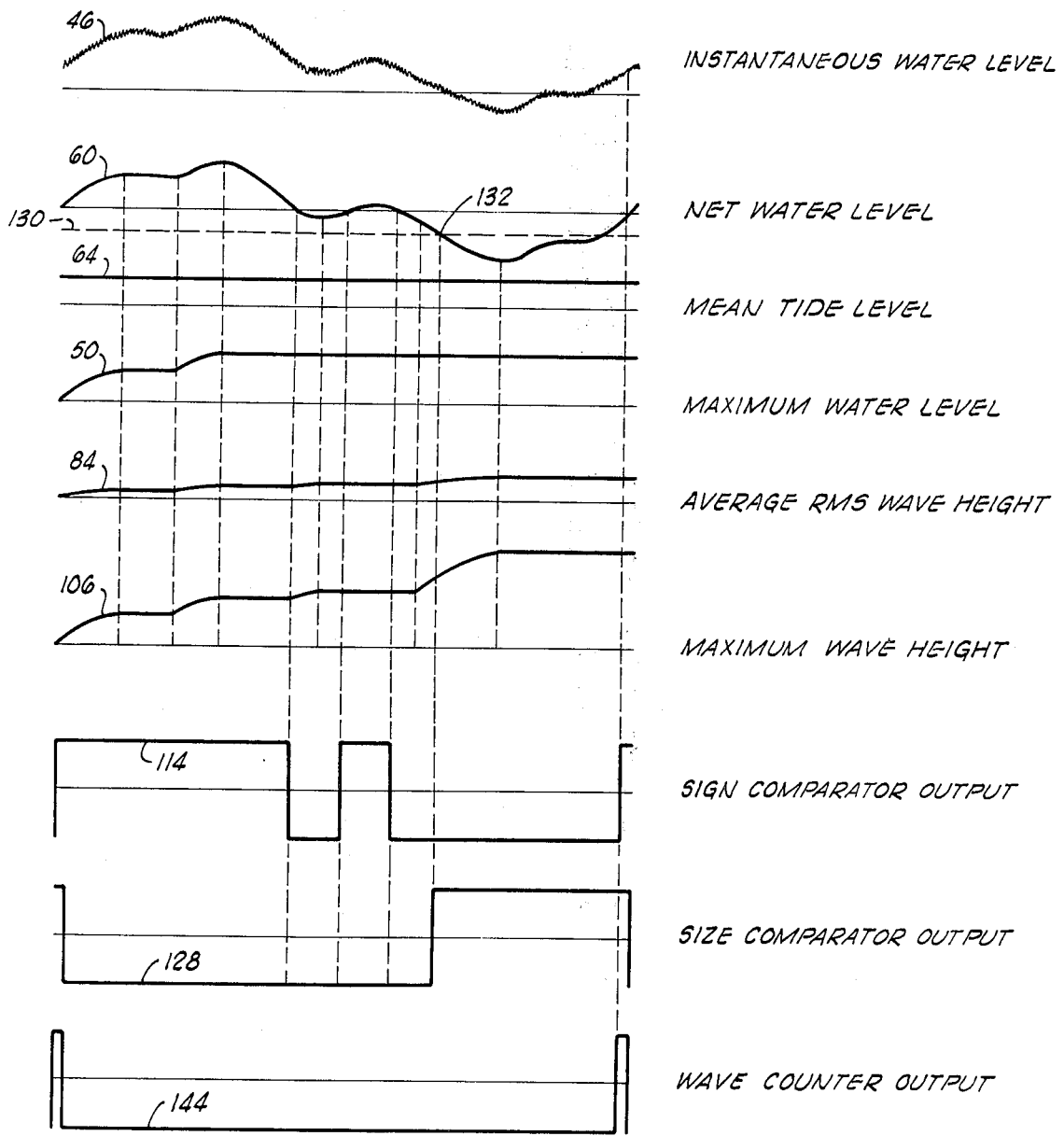
FIG. 2 illustrates a sample wave form and the resultant variations at various stages of the electronic wave analyzer.

FIG. 2 illustrates a sample wave form and the resulting variations at various stages of the electronic wave analyzer 18 beginning immediately after a reset operation has been completed. An instantaneous water level signal 46 produced by wave meter 10 as it measures a passing wave is basically unchanged as regards shape by scaler 14 before input via signal path 16 to the electronic wave analyzer 18. The other variations will be further explained below where appropriate for clarity.

For the purposes of this application, an operational amplifier is defined as a circuit comprised of a direct current (dc) amplifier and associated external impedances (resistors and capacitors) that together "operate" upon a voltage or current in some mathematical way. An FET op amp is an op amp which utilizes Field Effect Transistors in the amplifying circuit to minimize the deletrious effects of input current and maximize sensitivity.

Figures 3, 5:
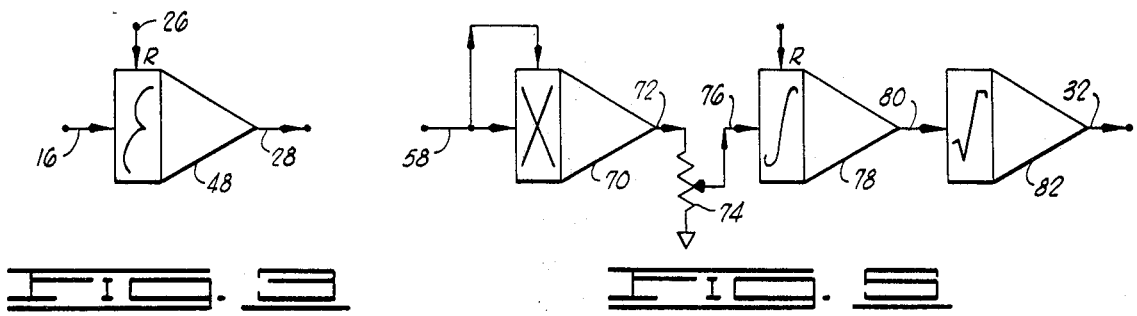
FIG. 3 is a circuit diagram in logic symbols showing components to compute and retain maximum water level.
FIG. 5 is a circuit diagram in logic symbols showing components to compute and retain average root mean square wave height.

FIG. 3 is a circuit diagram showing the component of the electronic wave analyzer 18 which computes the maximum water level. The standardized instantaneous water level signal 46 is applied via signal path 16 to peak remembering FET op amp 48. Upon the application of a reset signal on signal path 26 by computer 24, the peak remembering FET op amp 48 is reset and commences to detect and remember the greatest positive voltage applied to signal path 16 by wave meter 10 as is shown in FIG. 2 by maximum water level 50. Peak remembering FET op amp 48 continues to function until the next reset signal is applied to signal path 26 and makes available as output on signal path 28 the maximum water level 50 measured since the last reset. Peak remembering FET op amps are well known in the art and are commercially available from various manufacturers such as Bell and Howell as Peak-Remembering and One-Shot Reset Module Type 19-418A.

Figure 4:
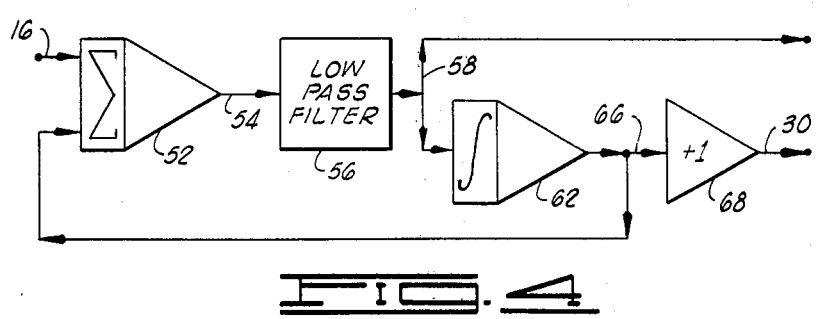
FIG. 4 is a circuit diagram in logic symbols showing components to compute and retain mean tide level.

FIG. 4 is a circuit diagram showing the components of the electronic wave analyzer 18 which compute the mean tide level. The instantaneous water level signal is applied via signal path 16 to adder/subtractor FET op amp 52. The output signal of adder/subtractor FET op amp 52, which represents the net water level as will be explained below, is applied via signal path 54 to low pass filter 56, a device well known in the art, which functions to remove spurious wave "chop" from the primary waves of interest by filtering waves having excessively high frequencies (e.g.-3db at 1 cps). FIG. 2 illustrates net water level 60 after being smoothed by low pass filter 56. The net water level is made available on signal path 58 for input to other components of the electronic wave analyzer 18 and to integrator FET op amp 62 which functions to "integrate" in a mathematical sense the applied input signal. The output signal of integrator FET op amp 62, which is the mean or average value of the net water level shown in FIG. 2 as the mean tide level 64, is applied via signal path 66 to the second input of adder/subtractor FET op amp 52. Adder/subtractor FET op amp 52 functions to subtract the mean tide level from the instantaneous water level to remove the relatively stable component due to tidal fluctuations and to output that component actually due to wave motion. Integrator FET op amp 62 therefore essentially functions to track and compensate for the relatively stable component of instantaneous water level due to tidal fluctuations by detecting trends in the net water level output from adder/subtractor FET op amp 52. The mean tide level is buffered by FET op amp 68 for output on signal path 30. Adder/subtractor, integrator and straight FET op amps are well known in the art and are commercially available from a variety of manufacturers such as Bell and Howell as Adder/Subtractor Module Type 19-301A, Dynamic Response Module Type 19-407A, and Booster Module Type 19-319 respectively.

FIG. 5 is a circuit diagram showing the classical sequence of components of the electronic wave analyzer 18 which compute the average rms wave height. The net water level is applied via signal path 58 to both inputs of multiplier FET op amp 70. Since both inputs have the same signal, multiplier FET op amp 70 functions to square in a mathematical sense the net water level. Note that an absolute value FET op amp may be required if multiplier FET op amp 70 cannot accept negative input values. The squared net water level is applied via signal path 72 to potentiometer 74 which functions to reduce the voltage level of the signal applied via signal path 76 to integrator FET op amp 78. The integrator FET op amp 78, like integrator FET op amp 62, functions to "integrate" or sum the input signal on signal path 76 to derive the mean of the squared net water level and potentiometer 74 functions to prevent premature saturation. The reset signal applied to signal path 26 is used to reset the integrator FET op amp 78 thereby initiating the integration function.

The mean of the squared net water level is applied via signal path 80 to square root FET op amp 82 which functions to take the square root in a mathematical sense of the mean squared net water level for output on signal path 32, shown in FIG. 2 as the average rms wave height 84. Multiplier and square root FET op amps are well known in the art and are commercially available from various manufacturers such as Bell and Howell as Multiplier Module Type 19-309, and Square Root Module Type 19-303, respectively.

Figure 6:
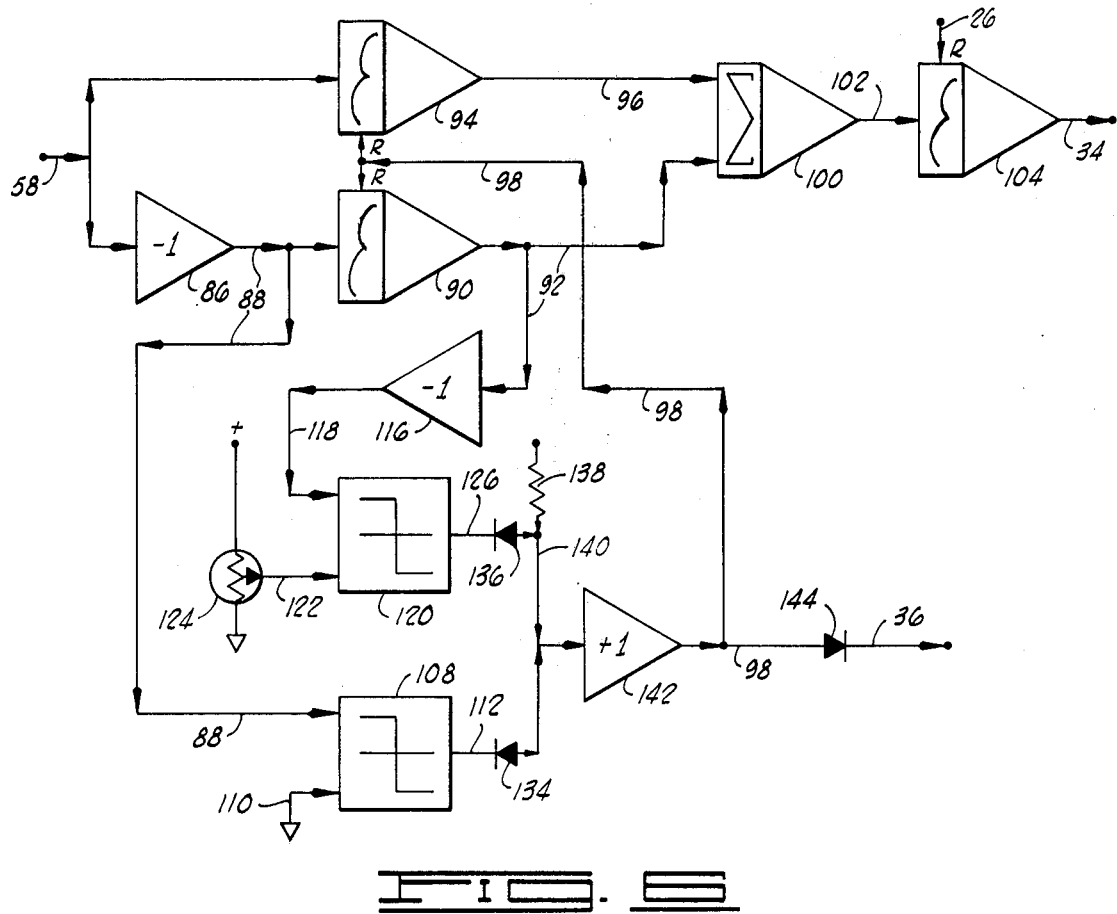
FIG. 6 is a circuit diagram in logic symbols showing components to compute and retain maximum wave height and number of waves.

FIG. 6 is a circuit diagram showing the components of the electronic wave analyzer 18 which compute the maximum wave height and detect significant waves. The net water level is applied via signal path 58 to the inverting input of FET op amp 86 which functions to invert in an electrical sense the net water level. FET op amp 86 is the same as FET op amp 68 above except that the inverting input is used. The inverted net water level is applied via signal path 88 to peak remembering FET op amp 90 which, as described above, functions to detect, "remember," and output on signal path 92, the maximum voltage input, representing the deepest wave trough measured, since the last reset. The net water level is also applied via signal path 58 to peak remembering FET op amp 94 which functions to detect, "remember", and output on signal 96 the maximum voltage input, representing the highest wave peak measured, since the last reset. Peak remembering FET op amps 90 and 94 are reset by a reset signal applied via signal path 98 by the wave detection components to be described below.

The maximum wave trough and wave peak signals are applied, via signal paths 92 and 96 respectively, to adder FET op amp 100 which functions to add the two input signals and output the sum representing wave height (peak-to-peak) on signal path 102. The sum is applied via signal path 102 to peak remembering FET op amp 104 which functions to detect, "remember" and output on signal path 34 the maximum voltage input, represented on FIG. 2 as the maximum wave height 106, since the last reset. Peak remembering FET op amp 104 is reset by the reset signal applied by computer 24 to signal path 26 as described above. Peak remembering, adder and straight FET op amps are well known in the art as described above.

The inverted net water level is applied via signal path 88 to comparator FET op amp 108. The other input to comparator FET op amp 108 is connected via signal path 110 to the system common. Comparator FET op amp 108 functions to compare the amplitude of the signals applied as inputs on signal paths 88 and 110 and produces a full-scale output on signal path 112 equal in polarity to that of the smaller of the two inputs. However, since one input is at common or ground potential, comparator FET op amp 108 produces a full-scale output of opposite polarities to that of the signal applied via signal path 88, i.e. the inverted net wave height. Therefore, comparator FET op amp 108 produces a full-scale positive output when the net water level is positive in relation to the mean tide level (i.e. a positive-going wave) and a full-scale negative output when the net water level is negative in relation to the mean tide level (i.e. a negative-going wave) and can be considered as a sign detector. Output of the sign detector components is illustrated in FIG. 2 as the sign comparator output 114. Note that the output reflects a full scale reversal when the net water level 60 changes sign (i.e. crosses the axis).

The maximum wave trough signal is applied via signal path 92 to the inverting input of FET op amp 116 which functions to invert in an electrical sense the maximum wave trough. The inverted maximum wave trough is applied via signal path 118 to comparator FET op amp 120. The other input to comparator FET op amp 120 is connected via signal path 122 to reference voltage FET op amp 124. Comparator FET op amp 120 functions to compare the amplitude of the signals applied as inputs on signal paths 118 and 122 and produces a full-scale output on signal path 126 equal in polarity to that of the smaller of the two inputs. Therefore, comparator FET op amp 120 produces a full-scale positive output when the maximum wave trough signal exceeds the level of the signal supplied by the reference voltage FET op amp 124 and a full-scale negative output when it does not FET the reference voltage. Reference voltage FEET op amp 124, therefore, assists in size detection to mask insignificant wave troughs near the mean tide level by supplying a reference voltage representing the minimum size wave trough to be considered in measuring peak-to-peak or maximum wave height. Output of the size detection components is illustrated in FIG. 2 as the size comparator output 128. For example, if reference voltage FET op amp 124 supplies a voltage equivalent in water level to the line 130 on the net water level illustration of FIG. 2, the size comparator output 128 will reflect a full scale reversal when the net water level falls below the line 130 as at point 132 as shown.

The signals applied via signal paths 112 and 126 to diodes 134 and 136, respectively, together with a positive reference voltage applied through resistor 138 are combined in a logical "AND" and applied via signal path 140 to FET op amp 142. The logical "AND" of the sign and size comparator outputs 114 and 128 is illustrated in FIG. 2 as the wave detector output 144. Since the wave detector output 144 is applied as a reset signal via signal path 98 to peak remembering FET op amps 90 and 94 thereby resetting the maximum wave trough signal applied to signal path 92 and reversing the size comparator output 128, the wave detector output 144 reverses after a relatively short period of time and takes on the appearance of a series of pulses representing passing waves. The output signal is also applied through diode 144 to signal path 36 to be accumulated as an indication of the number of waves. Reference voltage and comparator FET op amps are well known in the art and are commercially available from various manufacturers such as Bell and Howell as Ten-Turn Coefficient Module Type 19-308A, and Comparator Function Module Type 19-501 respectively.

Changes may be made in the construction and the arrangement of the parts or the elements of the various embodiments as disclosed herein without departing from the spirit and scope of the invention as defined in the following claims.

What is claimed is:

1. Apparatus for wave analysis comprising:

means to sense water level and produce a first output signal proportional to said water level;

first operational amplifier means responsive to said first output signal and to a second output signal to subtract from said first output signal, said second output signal, and to output said difference as a third output signal;

frequency filtering means responsive to said third output signal to pass only frequencies less than a predetermined maximum for output as a fourth output signal;

second operational amplifier means responsive to said fourth output signal to integrate said fourth output signal over a predetermined time period for output as said second output signal to said first operational amplifier means, said second output signal being an indication of the mean tide level;

actuating means to provide a reset signal, the time interval between the pulses of said reset signal determining the duration of a second predetermined time period;

third operational amplifier means responsive to said fourth output signal to square said fourth output signal for output as a fifth output signal;

fourth operational amplifier means responsive to said fifth output signal to integrate said fifth output signal over said second time period for output as a sixth output signal, said fourth operational amplifier means being reset by said reset signal; and fifth operational amplifier means responsive to said sixth output signal to take the square root of said sixth output signal for output as an indication of the average root mean square wave height.

2. Apparatus for wave analysis comprising:

means to sense water level and produce a first output signal proportional to said water level;

actuating means to produce a reset signal, the time interval between the pulses of said reset signal determining the duration of a first predetermined time period;

first operational amplifier means responsive to said first output signal to detect and hold the peak of said first output signal during said first time period for output as indication of the maximum water level detected during said first time period, said first operational amplifier means being reset by said reset signal;

second operational amplifier means responsive to said first output signal to subtract from said first output signal, a second output signal, and to output said difference as a third output signal;

frequency filtering means responsive to said third output signal to pass only frequencies less than a predetermined maximum for output as a fourth output signal;

third operational amplifier means responsive to said fourth output signal to integrate said fourth output signal over a second predetermined time period for output as said second output signal to said second operational amplifier means, said second predetermined time period being longer than said first predetermined time period, said second output signal being an indication of the mean tide level;

fourth operational amplifier means responsive to said fourth output signal to square said fourth output signal for output as a fifth output signal;

fifth operational amplifier means responsive to said fifth output signal to integrate said fifth output signal over said first time period for output as a sixth output signal, said fifth operational amplifier means being reset by said reset signal;

sixth operational amplifier means responsive to said sixth output signal to take the square root of said sixth output signal for output as an indication of the average root mean square wave height;

seventh operational amplifier means responsive to said fourth output signal to invert said fourth output signal for output as a seventh output signal;

eighth operational amplifier means responsive to said seventh output signal to detect and hold the peak of said seventh output as an eighth output signal, said eighth operational amplifier means being reset by a ninth output signal, a third time period being determined by the intervals between pulses of said ninth output signal;

ninth operational amplifier means responsive to said fourth output signal to detect and hold the peak of said fourth output signal during said third time period for output as a tenth output signal, said ninth operational amplifier means being reset by said ninth signal;

tenth operational amplifier means responsive to said eighth and tenth output signals to sum said eighth and tenth output signals for output as an eleventh output signal;

eleventh operational amplifier means responsive to said eleventh output signal to detect and hold the peak of said eleventh output signal during said first time period for output as an indication of the maximum wave height detected during said first time period, said eleventh operational amplifier means being reset by said reset signal;

twelfth operational amplifier means responsive to said seventh output signal to compare said seventh output signal to common potential and to produce a full scale output having polarity opposite to that of said seventh output signal for output as a twelfth output signal;

reference voltage means to produce a thirteenth output signal having constant voltage;

thirteenth operational amplifier means responsive to said eighth output signal to invert said eighth output signal for output as a fourteenth output signal;

fourteenth operational amplifier means responsive to said thirteenth and fourteenth output signals to compare said thirteenth and fourteenth output signals and to produce a full scale output having the same polarity as that of the smaller of said thirteenth and fourteenth output signals for output as a fifteenth output signal; and logical AND means responsive to said twelfth and fifteenth output signals to produce said ninth output signal indicative of simultaneous signals on both of said twelfth and fifteenth output signals, said ninth output signal being indicative of the passing of a single significant wave.

* * * * *